*(12)* United States Patent
Peinke et al.

(10) Patent No.: US 10,690,694 B2
(45) Date of Patent: Jun. 23, 2020

(54) DEVICE AND METHOD FOR DETERMINING AT LEAST ONE PARAMETER OF A FLOW OF A FLUID

(71) Applicant: CARL VON OSSIETZKY UNIVERSITÄT OLDENBURG, Oldenburg (DE)

(72) Inventors: Joachim Peinke, Oldenburg (DE); Michael Hölling, Oldenburg (DE); Stephan Barth, Oldenburg (DE); Jaroslaw Puczylowski, Oldenburg (DE)

(73) Assignee: CARL VON OSSIETZKY UNIVERSITÄT OLDENBURG, Oldenburg (DE)

( * ) Notice: Subject to any disclaimer, the term of this patent is extended or adjusted under 35 U.S.C. 154(b) by 229 days.

(21) Appl. No.: 15/543,028

(22) PCT Filed: Jan. 12, 2016

(86) PCT No.: PCT/EP2016/050457
§ 371 (c)(1),
(2) Date: Jul. 12, 2017

(87) PCT Pub. No.: WO2016/113247
PCT Pub. Date: Jul. 21, 2016

(65) Prior Publication Data
US 2018/0003733 A1     Jan. 4, 2018

(30) Foreign Application Priority Data

Jan. 12, 2015   (DE) ........................ 10 2015 000 064

(51) Int. Cl.
*G01P 5/04*      (2006.01)
*G01F 1/28*      (2006.01)
(Continued)

(52) U.S. Cl.
CPC ............... *G01P 5/04* (2013.01); *G01F 1/28* (2013.01); *G01F 1/8463* (2013.01); *G01P 5/02* (2013.01); *G01P 13/0026* (2013.01)

(58) Field of Classification Search
CPC .......... G01P 5/04; G01P 13/0026; G01P 5/02; G01F 1/8463; G01F 1/28
(Continued)

(56) References Cited

U.S. PATENT DOCUMENTS 3,216,247 A    11/1965  Miller
4,701,051 A *  10/1987  Buchhave ........... G01N 15/0205
                                          356/336
(Continued)

FOREIGN PATENT DOCUMENTS

CN    101806603 B    1/2012
DE    41 30 197 A1   3/1993
(Continued)

OTHER PUBLICATIONS

J. Puczylowski et al., New anemometer for offshore use, Journal of Physics: Conference Series 318 (2011) 072015.*
(Continued)

*Primary Examiner* — Marrit Eyassu
(74) *Attorney, Agent, or Firm* — McGlew and Tuttle, P.C.

(57) ABSTRACT

A device (10) for determining a parameter of a fluid flow includes an elastically deformable boom (23, 28, 33, 42, 47), with an inflow area (29, 31, 32, 37, 38, 39, 40, 44, 45, 46, 49, 50) for fluid and a measurement apparatus (16) measuring deformation of the boom. A section of the inflow area is aligned askew and/or curved to a main fluid inflow direction (25). The boom has an inflow structure (24, 30, 34, 43, 48) on one free end. The inflow structure has the fluid inflow area. To determine the parameter of the fluid flow at high resolution, in particular a high angle resolution, the boom
(Continued)

has a reflection surface (27) on a side facing away from the inflow structure and the measurement apparatus (16) has a laser (17). A beam axis (26) of the laser (17) is directed to the reflection surface (27) of the boom.

18 Claims, 7 Drawing Sheets

(51) Int. Cl.
  *G01P 5/02* (2006.01)
  *G01P 13/00* (2006.01)
  *G01F 1/84* (2006.01)
(58) Field of Classification Search
  USPC .......................................................... 73/1.16
  See application file for complete search history.

(56) References Cited

U.S. PATENT DOCUMENTS

| | | | | |
|---|---|---|---|---|
| 5,218,865 | A * | 6/1993 | Djorup | G01P 5/12 73/170.12 |
| 2009/0168073 | A1* | 7/2009 | Tai | G01Q 20/02 356/501 |
| 2009/0241684 | A1 | 10/2009 | Matsuba | |
| 2009/0241686 | A1 | 10/2009 | Bonnat | |
| 2010/0071477 | A1* | 3/2010 | Haehner | G01F 1/20 73/861.18 |
| 2012/0154812 | A1* | 6/2012 | Snyman | G01D 5/266 356/432 |
| 2014/0260596 | A1 | 9/2014 | Kubicek et al. | |

FOREIGN PATENT DOCUMENTS

| | | |
|---|---|---|
| DE | 44 25 434 A1 | 3/1995 |
| DE | 44 43 665 A1 | 6/1996 |
| DE | 100 58 378 A1 | 6/2002 |
| DE | 697 21 000 T2 | 11/2003 |
| DE | 102004013024 A1 | 11/2004 |
| DE | 103 39 906 A1 | 3/2005 |
| DE | 603 06 320 T2 | 5/2007 |
| DE | 10 2009 012 953 A1 | 11/2009 |
| DE | 10 2010 016 837 A1 | 1/2011 |
| FR | 2 764 066 A1 | 12/1998 |
| JP | 2006 023240 A | 1/2006 |
| WO | 2014/132138 A2 | 9/2014 |

OTHER PUBLICATIONS

Barth Stephan et al., Laser-Cantilever anemometer: A new high-resolution for air and liquid flows, Review of Scientific Instruments, AIP, Melville, NY, US, vol. 76, No. 7, Jul. 11, 2005, 76, 075110.*

"New anemometer for offshore use," J. Puczylowski, J. Peinke and M. Hölling, Journal of Physics: Conference Series 318 (2011) 072015.

Barth Stephan et al: "Laser-cantilever anemometer: A new high-resolution sensor for air and liquid flows", Review of Scientific Instruments, AIP, Melville, NY, US, vol. 76, No. 7, Jul. 11, 2005 (Jul. 11, 2005), pp. 75110-075110.

* cited by examiner

DEVICE AND METHOD FOR DETERMINING AT LEAST ONE PARAMETER OF A FLOW OF A FLUID

CROSS REFERENCE TO RELATED APPLICATIONS

This application is a United States National Phase Application of International Application PCT/EP2016/050457, filed Jan. 12, 2016, and claims the benefit of priority under 35 U.S.C. § 119 of German Application 10 2015 000 064.0, filed Jan. 12, 2015, the entire contents of which are incorporated herein by reference.

FIELD OF THE INVENTION

The present invention pertains to a device for determining at least one parameter of a flow of a fluid comprising an elastically deformable cantilever, which has at least one incoming flow surface for the fluid, and comprising a measuring device for measuring the deformation of the cantilever, wherein at least one section of the incoming flow surface is aligned obliquely and/or curved to a main incoming flow direction of the fluid, the cantilever has an incoming flow structure at one free end, and the incoming flow structure has the at least one incoming flow surface for the fluid. Furthermore, the present invention pertains to a method for determining at least one parameter of a flow of a fluid, especially with a device according to the present invention, in which an elastically deformable cantilever with at least one incoming flow surface for the fluid is inserted into a flow, and in which the deformation of the cantilever is measured with a measuring device based on the forces of the flow acting on the incoming flow surface, wherein at least one section of the incoming flow surface is aligned obliquely and/or curved to a main incoming flow direction of the fluid, the cantilever has an incoming flow structure at one free end, and the incoming flow structure has the at least one incoming flow surface for the fluid.

BACKGROUND OF THE INVENTION

Such a device and such a method are known from FR 2 764 066 A1.

Furthermore, a device and a method without an oblique and/or curved alignment of a section of the incoming flow surface to the main incoming flow direction of the fluid are known from the scientific article "New anemometer for offshore use," J. Puczylowski, J. Peinke and M. Hölling, Journal of Physics: Conference Series 318 (2011) 072015.

Parameters of a fluid flow, especially a velocity and/or flow direction of a fluid, can be determined by means of a corresponding device. For this, the cantilever can be exposed to a flow, wherein, due to the moving fluid, a force acts on the cantilever. This force leads to a deformation, especially to a bending and/or torsion, of the cantilever. The desired information, especially about the velocity and/or a contact angle, of the fluid are contained in the deformation. This information can be determined by means of various, already available methods. The so-called laser pointer principle, especially known from atomic force microscopy, is preferably used.

One drawback of the prior-art device is that the angular resolution is limited. Therefore, the basic object of the present invention is to further develop a device and a method of the type mentioned in the introduction such that the at least one parameter of the fluid flow to be determined can be determined at a higher resolution, especially at a higher angular resolution.

SUMMARY OF THE INVENTION

A basic object of the present invention is accomplished by means of a device and a method of the type mentioned in the introduction, in which the cantilever has a reflecting surface on a side facing away from the incoming flow structure and the measuring device has a laser, wherein a beam axis of the laser is or becomes directed at the reflecting surface of the cantilever.

In this case, it is advantageous that because of the oblique and/or curved arrangement of at least one section of the incoming flow surface to a main incoming flow direction of the fluid, a higher angular resolution can be obtained in relation to the at least one parameter of the fluid flow to be determined. In particular, a velocity and/or a flow direction of a fluid can be determined at a higher angular resolution. Thus, a present oblique component or transverse component of the flow to the main incoming flow direction of the fluid can be detected and resolved better.

Within the scope of the present invention, the main incoming flow direction of the fluid may be preset as a mean and/or average flow direction of the fluid. In particular, an incoming flow angle of 0° is associated with the main incoming flow direction of the fluid. The flow directions and/or incoming flow angle of the fluid to be determined can be distributed in an angle range of −45° to +45°, especially preferably from −90° to +90°, in relation to the incoming flow angle, especially by the incoming flow angle of 0° and/or the main incoming flow direction of the fluid. The flow directions and/or incoming flow angle of the fluid to be determined are preferably distributed uniformly, mirror-symmetrically and/or equally about the main incoming flow direction of the fluid.

According to another embodiment, a plane and/or a tangent of a curvature of the incoming flow surface is aligned obliquely to the main incoming flow direction of the fluid. In particular, a plurality of tangents of a curvature of the incoming flow surface are aligned obliquely to the main incoming flow direction of the fluid. Because of the oblique arrangement of a plane of the incoming flow surface and/or of at least one tangent of a curvature of the incoming flow surface to the main incoming flow direction, improved response characteristics of the cantilever can be obtained. Improved response characteristics with regard to an oblique component and/or a transverse component of the flow of the fluid obliquely, especially at right angles, to the main incoming flow direction of the fluid are preferably obtained. A stronger torsion of the cantilever can preferably be achieved by means of the oblique and/or curved alignment of the incoming flow surface to the main incoming flow direction. The plane and/or the tangent of the curvature of the incoming flow surface can be aligned obliquely to a longitudinal axis of the device. An oblique alignment of at least one section of the incoming flow surface is preferably defined within the framework of the present invention as an alignment of a plane and/or of a tangent of a curvature of the incoming flow surface in relation to the main incoming flow direction at an angle of less than 90°, especially in the range of 40° to 50°, and especially preferably 45°.

According to a variant, the measuring device has a laser. A plane and/or a tangent of a curvature of the incoming flow surface can be aligned obliquely to a beam or to a beam axis of the laser. The measuring device may have a reflecting surface for the laser. In particular, a plane of the reflecting surface for reflecting the laser beam is aligned obliquely to the beam axis of the laser. The beam axis of the laser is preferably directed at the reflecting surface of the cantilever. The beam axis of the laser may impact obliquely and/or at a right angle to the plane of the reflecting surface, especially in an unloaded state of the cantilever. In an unloaded state of the cantilever, no force of a flow of the fluid is preferably acting on the cantilever. In particular, the reflecting surface is arranged on a side of the cantilever facing away from the incoming flow surface. The reflecting surface is preferably arranged in an area of one free end of the cantilever. In particular, the reflecting surface has a material reflecting the beam of the laser. For example, the reflecting surface may be made of aluminum.

The at least one section of the incoming flow surface, a plane of the at least one incoming flow surface and/or a tangent of a curvature of the at least one incoming flow surface may be aligned obliquely to the main incoming flow direction of the fluid at an angle in the range of 35° to 55°, especially in a range of 40° to 50°, and preferably at an angle of 45°. As an alternative or in addition, a corresponding alignment can be aligned obliquely to a longitudinal axis of the device and/or obliquely to a beam axis of a laser of the measuring device.

According to another embodiment, the cantilever is associated with a carrier structure. The cantilever may be fastened to the carrier structure and/or to a sensor element arranged on the carrier structure. The cantilever and the carrier structure preferably form a sensor element. The sensor element, the cantilever and/or the carrier structure may be made of silicon or stainless steel. The cantilever preferably has a rod-like and/or plate-like configuration. In particular, the incoming flow surface of the cantilever has a rectangular configuration. The cantilever may be fastened with a first end to the carrier structure. Starting from the carrier structure, the cantilever can extend away from the carrier structure. In particular, the cantilever has one free end facing away from the carrier structure. The cantilever may have a length of up to 2 mm, especially a length in the range of 100 µm to 250 µm. The cantilever preferably has a width of up to 0.5 mm, especially a width in the range of 20 µm to 60 µm. The cantilever especially preferably has a thickness of up to 30 µm, especially a thickness in the range of 1 µm to 3 µm. A horizontal and/or transverse velocity and/or an incoming flow angle component can be determined by means of the cantilever. In particular, a spatial resolution in the range of 1 mm and/or a temporal resolution in the range of 1 kHz and/or higher can be obtained. In particular, velocity components and/or angle components can be determined on size scales below 1 mm and/or in the frequency range above 50 kHz.

According to a variant, the cantilever has an incoming flow structure at one free end. The cantilever and/or the incoming flow structure preferably has a fluid-dynamic profile. As a result, the response characteristics of the cantilever with regard to a deformation, especially a bending and/or torsion, can be improved. In particular, the fluid-dynamic profile is configured for producing a dynamic lift when the fluid is flowing about it. As a result, a suction action can be obtained on one side of the cantilever and/or of the incoming flow structure facing away from the incoming flow surface. A pressing action can be obtained in the area of the incoming flow surface. Thus, a higher force can act on the cantilever to deform the cantilever.

The incoming flow structure preferably has the at least one incoming flow surface for the fluid. In particular, the cantilever may have a first incoming flow surface, and the incoming flow structure may have at least one additional incoming flow surface. The incoming flow structure may have a plurality of additional incoming flow surfaces, especially two, three, four or more additional incoming flow surfaces. The at least one additional incoming flow surface preferably extends starting away from the first incoming flow surface. In particular, a section and/or a plane of the first incoming flow surface of the cantilever is aligned obliquely or at right angles to a section, a plane and/or a tangent of a curvature of the at least one additional incoming flow surface of the incoming flow structure. As a result, the response characteristics of the cantilever with regard to a torsion of the cantilever can be improved based on a force of the flow of the fluid acting on the first incoming flow surface and/or the at least one additional incoming flow surface.

The incoming flow structure may be produced from a photoresist, preferably SU-8. The incoming flow structure may have a height of up to 0.5 mm, especially a height in the range of 20 µm to 60 µm. The incoming flow structure preferably has a length of up to 0.5 mm, especially a length in the range of 20 µm to 60 µm. The incoming flow structure especially preferably has a thickness of up to 50 µm, especially a thickness in the range of 6 µm to 12 µm.

According to another embodiment, the incoming flow structure has an essentially V-shaped configuration. In this case, the incoming flow structure may selectively have two legs or be configured as a wedge-like structure. The cantilever preferably has a first incoming flow surface and the V-shaped incoming flow structure extends away starting from the first incoming flow surface. In particular, the incoming flow structure is facing the main incoming flow direction of the fluid. A section of the incoming flow surface, a first incoming flow surface and/or at least one additional incoming flow surface is preferably facing the main incoming flow direction of the fluid. The V-shaped incoming flow structure may open in a funnel-like manner in a direction away from the first incoming flow direction. As an alternative, the V-shaped incoming flow structure may form a ramp, a wedge, a ramp-like and/or wedge-like tip or needle directed away from the first incoming flow surface.

According to a variant, the measuring device has a beam splitter plate and/or a beam splitter membrane. A corresponding beam splitter is preferably arranged in a beam path for a beam of a laser. In particular, such a beam splitter is used for diffracting and/or deflecting a beam reflected on the reflecting surface in the direction of a detector. The measuring device preferably has an especially two-dimensional, position-sensitive detector for detecting a position of a beam of the laser reflected by the cantilever and/or the reflecting surface. The beam splitter is preferably configured as a pellicle beam splitter. The so-called ghosting can be avoided by means of such a beam splitter. Undesired multiple reflections occur in case of ghosting. The position-sensitive detector (PSD) makes it possible to determine the point of impact of the reflected beam on a two-dimensional measuring surface of the detector. The position of the point of impact on the detector is indicative of the torsion and/or bending of the cantilever. This information is indicative of the velocity, the flow direction and/or the incoming flow angle of the fluid.

According to another embodiment of the method according to the present invention, the deformation of the cantilever occurs because of a bending and/or torsion of the cantilever because of the forces of the flow of the fluid acting on the at least one incoming flow surface. Here, the velocity can be evaluated as a function of the bending, and/or the flow direction, especially an incoming flow angle, can be evaluated as a function of the torsion of the cantilever. In this connection, an angle range of +45° to −45°, especially of +90° to −90°, in relation to the main incoming flow direction of the fluid is preferably covered.

A device according to the present invention and/or a method according to the present invention for determining at least one parameter of a flow of a fluid, especially of a velocity, and/or of a flow direction of the fluid is especially advantageous. A longitudinal and/or a transverse velocity component can preferably be determined. In this case, the longitudinal velocity component may be aligned parallel to the main incoming flow direction of the fluid and/or may correspond to a velocity component in the main incoming flow direction. The transverse velocity component may be aligned obliquely, especially at right angles, to the longitudinal velocity component and/or to the main incoming flow direction. In particular, a two-dimensional measurement of the at least one parameter to be determined is made possible. The fluid may be a gas or a liquid. In particular, the device is configured as a cantilever anemometer, preferably as a two-dimensional laser cantilever anemometer (2d-LCA). The device according to the present invention and/or the method according to the present invention may be used in research, air and/or space travel, wind energy, medicine and/or in connection with mixing and/or combustion processes.

The present invention is explained in more detail below on the basis of the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
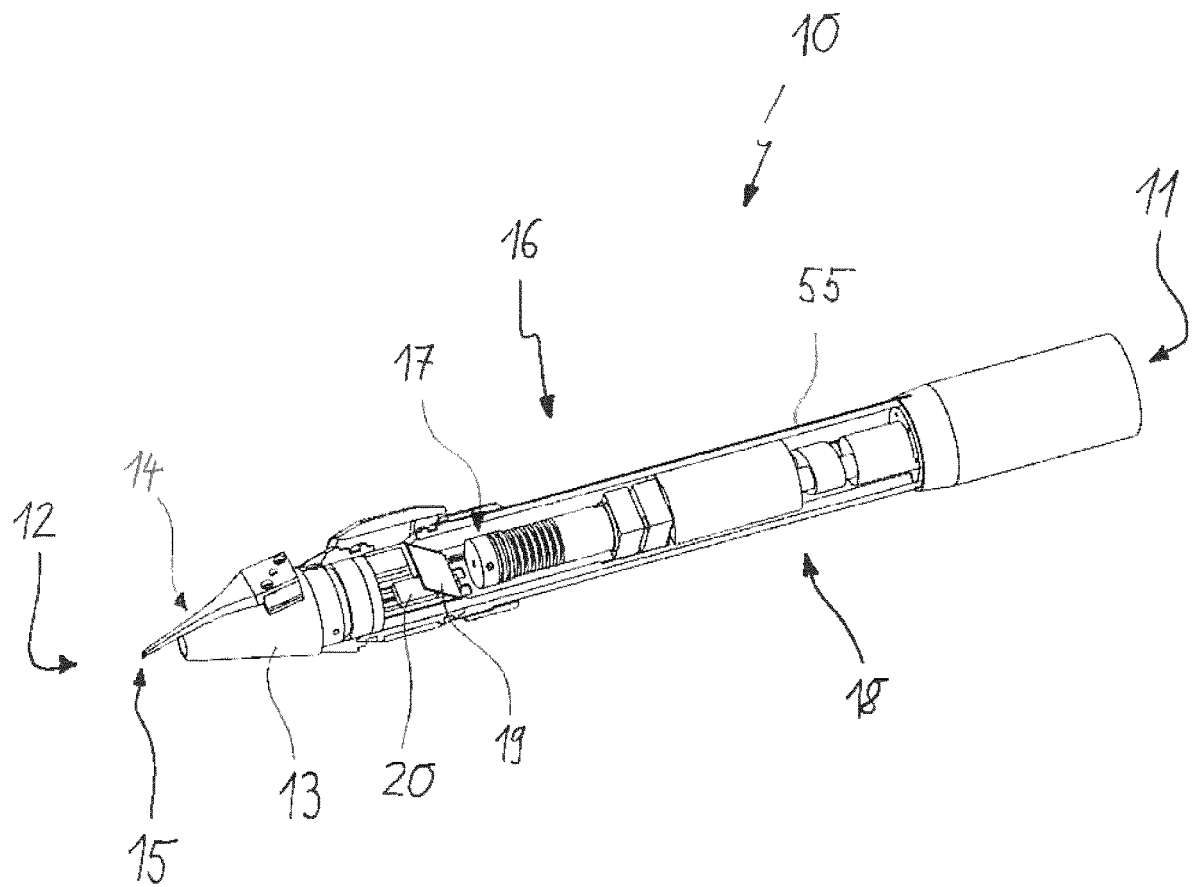
FIG. 1 is a schematic perspective partial view of a device according to the present invention.

Referring to the drawings, FIG. 1 shows a schematic perspective partial view of a device 10 according to the present invention. According to this partial view, a housing 55 of the device 10 is partly open or removed, so that an internal construction of the device 10, which is usually enclosed by the housing 55 shown as not closed here, can be seen.

In this exemplary embodiment, the device 10 has an essentially oblong or elongated, especially pin-like, shape. The device 10 has a back end 11 and a front end 12. The front end 12 has a conical housing tip 13. The conical housing tip 13 has an angle, which is about 24° in this exemplary embodiment, opening in the direction of the back end 11. The housing tip 13 has a rod-like carrier structure fastened on the outer circumference, which carrier structure projects over the end of the housing tip 13 running in the direction of the front end 12. A sensor element 15, which protrudes beyond the housing tip 13 in a direction facing away from the back end 11, is arranged at one free end of the carrier structure 14. The sensor element 15 has an elastically deformable cantilever that cannot be seen in more detail here, which will be shown and explained in detail in connection with the following figures.

A measuring device 16 for measuring the deformation of the cantilever of the sensor element 15 is arranged between one end of the housing tip 13 facing away from the carrier structure 14 or from the sensor element 15 and the back end 11. The measuring device 16 has a laser 17, which is arranged in a central area of the device 10 in this exemplary embodiment. Here, the laser 17 is configured, for example, as a laser diode of the type ADL-63054TA2 having a wavelength of 630 nm and a power of 5 mW.

A positioning device 18 for positioning or adjusting the laser 17 is arranged between the back end 11 of the device 10 and the laser 17. In this exemplary embodiment, the laser 17 can be adjusted by means of the positioning device 18 and a remote control, not shown in more detail here, as a result of which an opening of the housing 55 of the device can be avoided. According to this exemplary embodiment, the positioning device 18 for positioning or adjusting the laser 17 has two DC motors.

A beam splitter 19 and a position-sensitive detector 20 are arranged between the laser 17, which is aligned with regard to its laser beam, which is not shown in more detail here, such that the laser beam impacts the cantilever of the sensor element 15, and the housing tip 13. The position-sensitive detector 20 is configured here as a two-dimensional component, namely, as a so-called two-dimensional position-sensitive detector (PSD). A detector 20 of the type Hamamatsu S5990 is installed here, for example.

Figure 2:
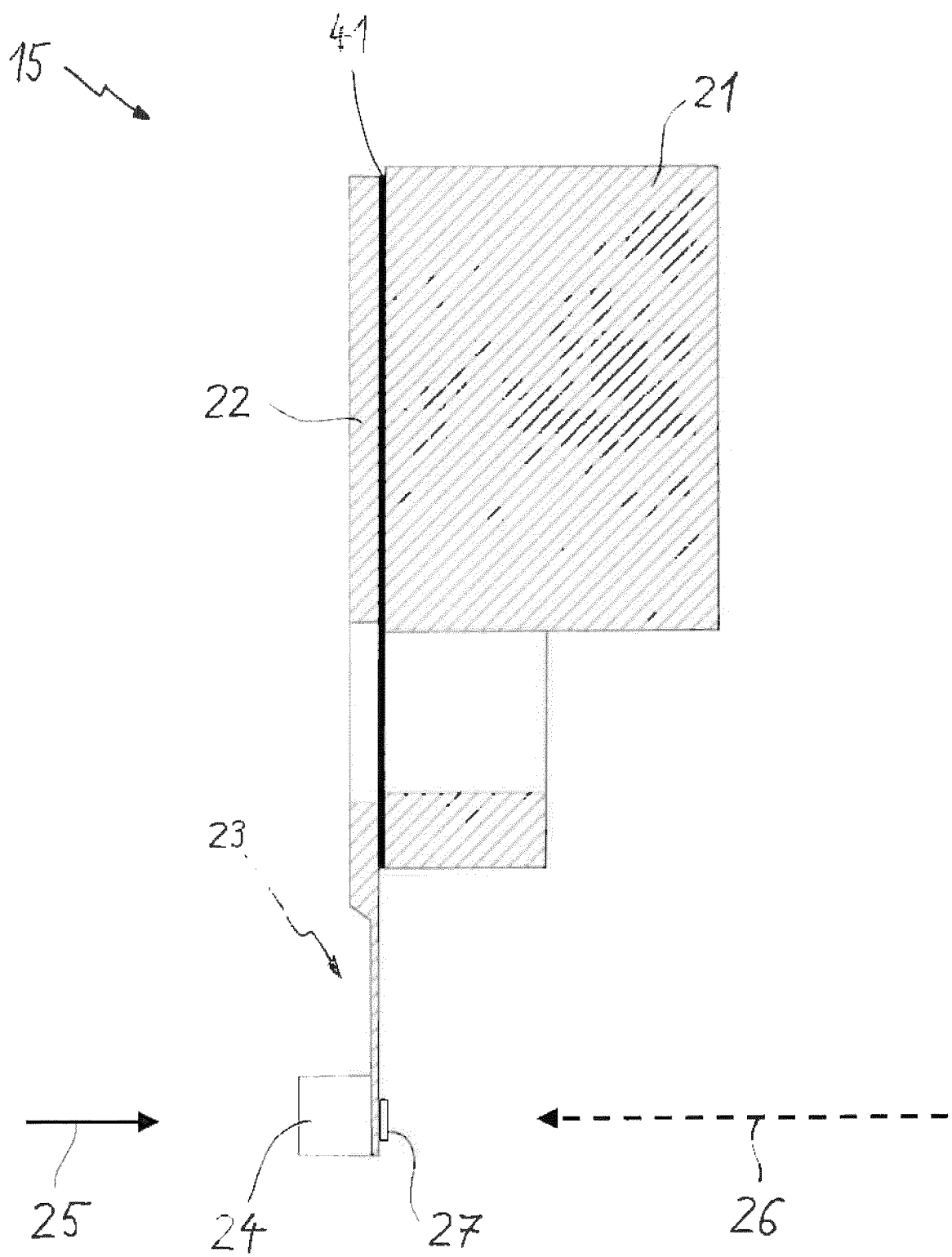
FIG. 2 is a schematic lateral view of a sensor element for a device according to the present invention according to FIG. 1.

FIG. 2 shows a schematic lateral view of the sensor element 15 for the device 10 according to the present invention according to FIG. 1. The sensor element 15 has a basic component 21, a carrier component 22 and an elastically deformable cantilever 23.

The sensor element 15 is configured as a cantilever chip in this exemplary embodiment. The sensor element 15 is made of silicon, for example, by means of a photolithography method here. The basic component 21 is used for fastening the sensor element 15 at the free end of the carrier structure 14 according to FIG. 1. The basic component 21 and the carrier component 22 are separated from one another by means of a separating layer 41. In this exemplary embodiment, the separating layer 14 is made of silicon oxide and has a thickness of 1 μm.

The carrier component 22 extends beyond the basic component 21 on one side of the basic component 21. The cantilever 23 is fastened to the carrier component 22 at one end of the carrier component 22 facing away from the basic component 21. The cantilever 23 in this exemplary embodiment has an essentially rod-like configuration and extends, starting from the carrier component 22, away from same and the basic component 21. The cantilever 23 is configured as a so-called cantilever. In this exemplary embodiment, the cantilever 23 has a length of 160 μm. The width of the cantilever 23 here is, for example, 40 μm and the thickness is 1.6 μm.

The cantilever 23 has an incoming flow structure 24 at one free end. A fluid, not shown in more detail here, flows against the cantilever 23 and the incoming flow structure 24 according to arrow 25. In this case, the arrow 25 represents a main incoming flow direction of the fluid. In this exemplary embodiment, the main incoming flow direction according to arrow 25 is aligned at right angles to the longitudinal alignment of the cantilever 23. A beam 26 of the laser 17 according to FIG. 1 is directed at a side of the cantilever 23 facing away from the incoming flow structure 24. Furthermore, the main incoming flow direction according to arrow 25 is arranged in the same plane as the beam 26 according to this example. In this exemplary embodiment, the beam 26 and the main incoming flow direction according to arrow 25 are located on the same axis and are directed towards one another.

The cantilever 23 has a reflecting surface 27 for reflecting the beam 26 on a side facing away from the incoming flow structure 24. The reflecting surface 27 is made of a layer of aluminum in this exemplary embodiment.

Figure 3:
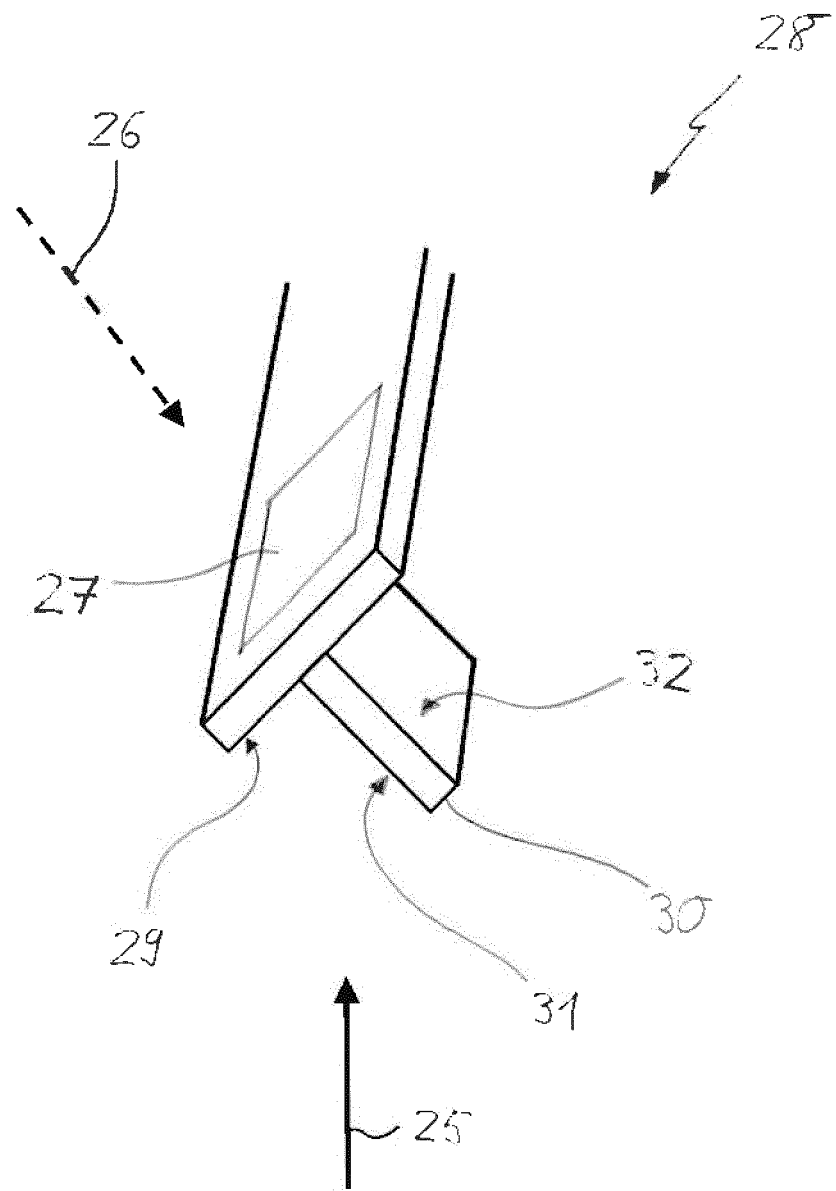
FIG. 3 is a schematic perspective lateral view of a first embodiment of a cantilever for a device according to the present invention.

FIG. 3 shows a schematic perspective lateral view of a first embodiment of a cantilever 28 for a device 10 according to the present invention. For example, the cantilever 28 can be used instead of the cantilever 23 according to FIG. 2. The elastically deformable cantilever 28 has an essentially plate-like configuration, the dimensions of which in this exemplary embodiment correspond to those of the cantilever 23 according to FIG. 2. The cantilever 28 has a first incoming flow surface 29, which is facing a flow of a fluid according to arrow 25 when the cantilever 28 is being used.

Furthermore, the cantilever 28 has an incoming flow structure 30, which is fastened to same in the area of the free end of the cantilever 28. The incoming flow structure 30 extends starting away from the first incoming flow surface 29. The first incoming flow surface 29 and the incoming flow structure 30 are arranged on a side of the cantilever 28 facing away from the reflecting surface 27. In this exemplary embodiment, the incoming flow structure 30 is configured as a plate-like component with a height of 30 μm, a length of 40 μm and a thickness of 9 μm. Here, the incoming flow structure 30 is made of the photoresist SU-8, for example. The incoming flow structure 30 extends at a right angle to the first incoming flow surface 29. The incoming flow structure 30 is arranged on the first incoming flow surface 29 approximately centrally to the width of same.

The first incoming flow structure 30 provides a plurality of additional incoming flow surfaces 31, 32. Here, the two additional incoming flow surfaces 31, 32 are arranged on two sides of the incoming flow structure 30 facing away from one another. The planes of the two additional incoming flow surfaces 31, 32 are aligned parallel to one another. Furthermore, the planes of the two additional incoming flow surfaces 31, 32 are aligned at right angles to the plane of the first incoming flow surface 29.

Furthermore, the cantilever 28 or the first incoming flow surface 29 is aligned such that the additional incoming flow surface 31 is used here as a second incoming flow surface for the fluid. In this case, the second incoming flow surface 31 is aligned obliquely, and in this exemplary embodiment at an angle of about 45°, to the main incoming flow direction of the fluid according to arrow 25. In this exemplary embodiment, the flow of the fluid according to arrow 25 corresponds to the main incoming flow direction, wherein the main incoming flow direction according to arrow 25 in this exemplary embodiment lies in a plane that is aligned at right angles to the planes of the first incoming flow surface 29 and of the additional incoming flow surfaces 31, 32.

As an alternative to the view in FIG. 3, the cantilever 28 may be arranged rotated clockwise by 90° about its longitudinal axis. In this case, the additional incoming flow surface 32 is used as the second incoming flow surface for the fluid.

In this exemplary embodiment, the plane of the first incoming flow surface 29 is aligned obliquely to the main incoming flow direction according to arrow 25 of the fluid, which is not shown in more detail here. For this, the device 10 according to FIG. 1 or the beam 26 of the laser 17 is aligned obliquely to the main incoming flow direction according to arrow 25. In this exemplary embodiment, the plane of the first incoming flow surface 29 or the beam axis of the laser 17 according to arrow 25 is aligned at an angle of about 45° to the main incoming flow direction of the fluid. Furthermore, the planes of the additional incoming flow surfaces 31, 32 extend parallel to the longitudinal axis of the cantilever 28.

Figure 4:
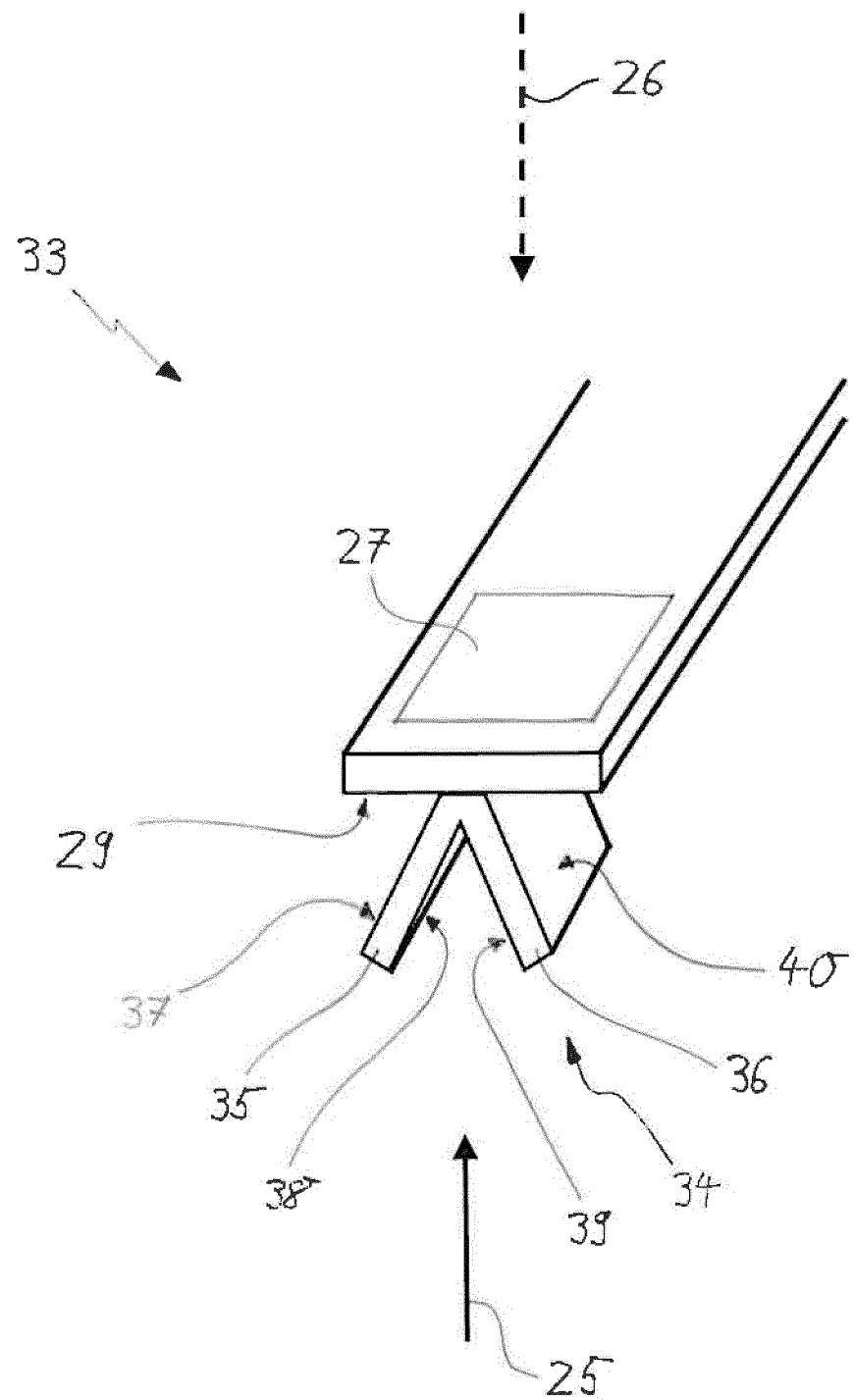
FIG. 4 is a schematic perspective lateral view of a second embodiment of a cantilever for a device according to the present invention.

FIG. 4 shows a schematic perspective lateral view of a second embodiment of a cantilever 33 for a device 10 according to the present invention. In terms of its configuration and its dimensions, the cantilever 33 corresponds largely to the cantilever 28 or to the cantilever 23. Thus, the cantilever 33 likewise has a first incoming flow surface 29 and the reflecting surface 27 on a side facing away from the first incoming flow surface 29.

Unlike the cantilever 28 according to FIG. 3, the cantilever 33 has an incoming flow structure 34 in the area of its free end. The incoming flow structure 34 has an essentially V-shaped configuration. The incoming flow structure 34 is fastened approximately centrally to the first incoming flow surface 29 and extends away from the first incoming flow surface 29. The incoming flow structure 34 has a first leg 35 and a second leg 36. Starting from the first incoming flow surface 29, the two legs 35, 36 extend away from one another. The first leg 35 has two additional incoming flow surfaces 37, 38 on two sides of the first leg 35 facing away from one another. The second leg 36 has two additional incoming flow surfaces 39, 40, which are arranged on two sides of the second leg 36 facing away from one another. The two additional incoming flow surfaces 37 and 38 as well as the two additional incoming flow surfaces 39 and 40 are each aligned parallel to one another. Furthermore, the additional incoming flow surfaces 38 and 39 are facing one another. The additional incoming flow surfaces 37 and 40 are facing away from one another. In this exemplary embodiment, the legs 35, 36 are aligned at an angle of about 45° to one another. As an alternative, a different angle, in the range of 30° to 90° or 120°, is conceivable. Starting from the first incoming flow surface 29 and extending away from same, the legs 35, 36 open in a funnel-like manner. Furthermore, the legs 35, 36 are aligned at an angle of about 45° to the plane of the first incoming flow surface 29 in this example.

The plane of the first incoming flow surface 29 is aligned at right angles to the main incoming flow direction of the fluid according to arrow 25. Furthermore, the beam 26 of the laser 17 is likewise aligned at right angles to the plane of the first incoming flow surface 29 of the cantilever 33. By contrast, the additional incoming flow surfaces 37, 38, 39, 40 of the incoming flow structure 34 are aligned obliquely to the plane of the first incoming flow surface 29 and thus obliquely to the main incoming flow direction of the flow according to arrow 25 as well as obliquely to the beam 26 of the laser 17. In this exemplary embodiment, the planes of the additional incoming flow surfaces 37, 38, 39, 40 are aligned at an angle of about 45° to the main incoming flow direction of the fluid according to arrow 25 or to the beam 26 of the laser 17. Furthermore, the planes of the additional incoming flow surfaces 37, 38, 39, 40 extend parallel to the longitudinal axis of the cantilever 33. In this exemplary embodiment, the main incoming flow direction according to arrow 25 lies in a plane, which is aligned at right angles to the planes of the first incoming flow surface 29 and of the additional incoming flow surfaces 37, 38, 39, 40.

Figure 5:
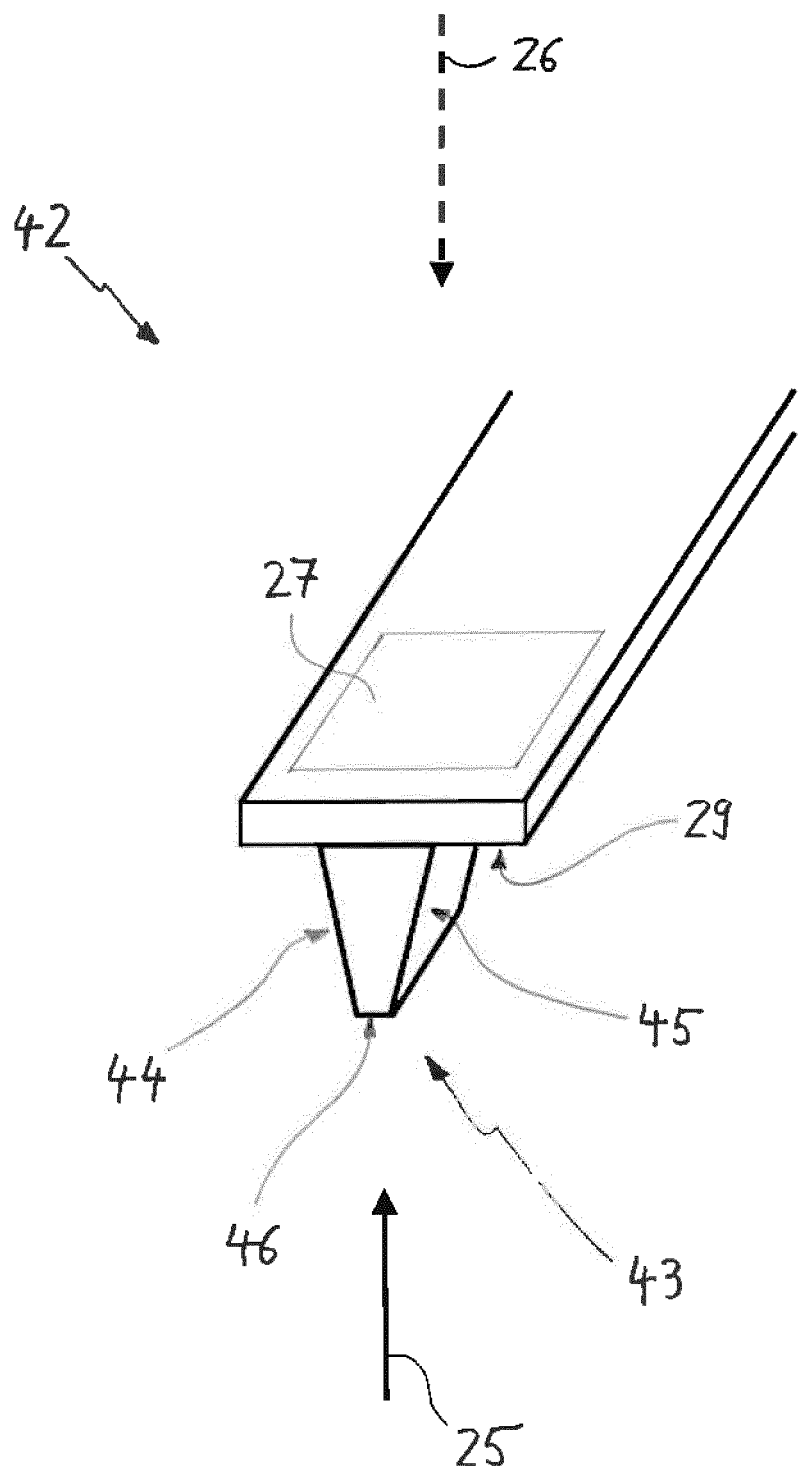
FIG. 5 is a schematic perspective lateral view of a third embodiment of a cantilever for a device according to the present invention.

FIG. 5 shows a schematic perspective lateral view of a third embodiment of a cantilever 42 for a device 10 according to the present invention. In terms of its configuration and its dimensions, the cantilever 42 corresponds largely to the cantilevers 23, 28, 33. Thus, the cantilever 42 likewise has a first incoming flow surface 29 and the reflecting surface 27 on a side facing away from the incoming flow surface 29.

Unlike the cantilevers 23, 28, 33, the cantilever 42 has an incoming flow structure 42 in the area of its free end. In terms of its outer contour, the incoming flow structure 43 has an essentially V-shaped or funnel-like configuration. However, the incoming flow structure 43 has no legs, but rather is made of a solid material in this exemplary embodiment. The incoming flow structure 43 is fastened approximately centrally to the first incoming flow surface 29 and extends away from the first incoming flow surface 29.

The incoming flow structure 43 has two additional incoming flow surfaces 44, 45 on two sides of the incoming flow structure 43 facing away from one another. The additional incoming flow surfaces 44 and 45 are facing away from one another. In this exemplary embodiment, the two incoming flow surfaces 44, 45 are aligned at an angle of about 105° to the plane of the first incoming flow surface 29. Starting from the first incoming flow surface 29 and extending away from same, the additional incoming flow surfaces 44, 45 run towards one another in a funnel-like or ramp-like manner. In this exemplary embodiment, the additional incoming flow surfaces 44, 45 do not run together into a common edge, but rather the additional incoming flow surfaces 44, 45 run towards one another starting from the first incoming flow surface 29 and end in a third additional incoming flow surface 46. The third additional incoming flow surface 46 is facing away from the first incoming flow surface 29. The plane of the third additional incoming flow surface 46 is aligned parallel to the plane of the first incoming flow surface 29. As an alternative, the additional incoming flow surfaces 44, 45 may run together into a common edge instead of the third additional incoming flow surface 46.

The plane of the first incoming flow surface 29 is aligned at right angles to the main incoming flow direction of the fluid according to arrow 25. Furthermore, the beam 26 of the laser 17 is likewise aligned at right angles to the plane of the first incoming flow surface 29 of the cantilever 42. By contrast, the additional incoming flow surfaces 44, 45 of the incoming flow structure 43 are aligned obliquely to the plane of the first incoming flow surface 29 and thus obliquely to the main incoming flow direction of the flow according to arrow 25 as well as obliquely to the beam 26 of the laser 17. In this exemplary embodiment, the planes of the additional incoming flow surfaces 44, 45 are aligned at an angle of about 15° to the main incoming flow direction of the fluid according to arrow 25 or to the beam 26 of the laser 17. Furthermore, the planes of the additional incoming flow surfaces 44, 45 extend parallel to the longitudinal axis of the cantilever 42. In this exemplary embodiment, the main incoming flow direction according to arrow 25 lies in a plane, which is aligned at right angles to the planes of the first incoming flow surface 29 and of the additional incoming flow surfaces 44, 45.

Figure 6:
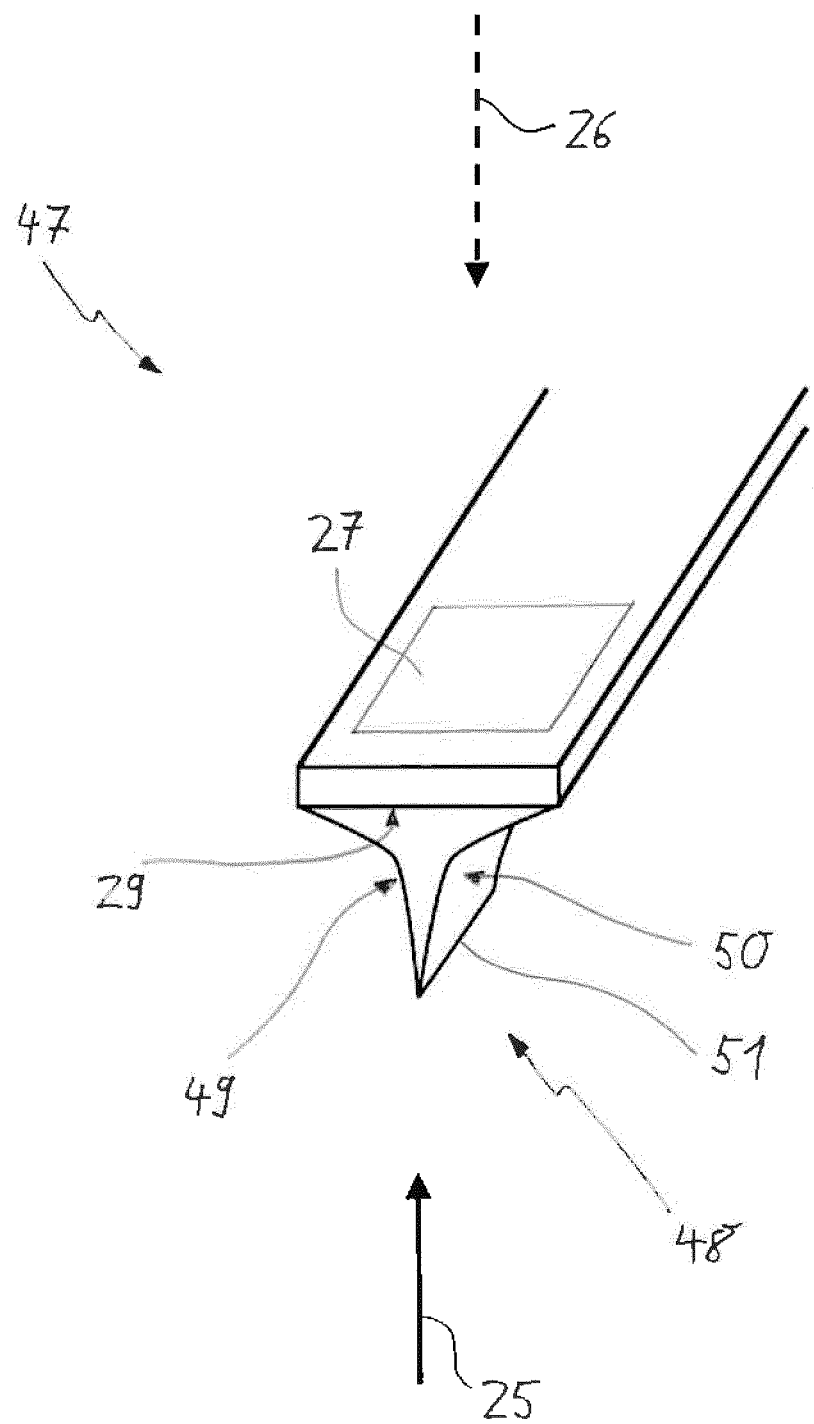
FIG. 6 is a schematic perspective lateral view of another embodiment of a cantilever for a device according to the present invention.

FIG. 6 shows a schematic perspective lateral view of another embodiment of a cantilever 47 for a device 10 according to the present invention. In terms of its configuration and its dimensions, the cantilever 47 corresponds largely to the cantilevers 23, 28, 33, 42. Thus, the cantilever 47 likewise has a first incoming flow surface 29 and the reflecting surface 27 on a side facing away from the incoming flow surface 29.

Unlike the cantilevers 23, 28, 33, 42, the cantilever 47 has an incoming flow structure 48 in the area of its free end. In terms of its outer contour, the incoming flow structure 48 has an essentially V-shaped or funnel-like configuration. However, the incoming flow structure 48 has no legs, but rather is made of a solid material in this exemplary embodiment. The incoming flow structure 48 is fastened approximately centrally to the first incoming flow surface 29 and extends away from the first incoming flow surface 29.

The incoming flow structure 48 has two additional incoming flow surfaces 49, 50 on two sides of the incoming flow structure 48 facing away from one another. The additional incoming flow surfaces 49 and 50 are facing away from one another. In this exemplary embodiment, the two incoming flow surfaces 49, 50 are aligned in a curved manner. Starting from the first incoming flow surface 29 and extending away from same, the additional, curved incoming flow surfaces 49, 50 run towards one another in a funnel-like or ramp-like manner. In this exemplary embodiment, the additional incoming flow surfaces 49, 50 run together into a common incoming flow edge 51. The incoming flow edge 51 extends in the longitudinal direction of the cantilever 48. Furthermore, the curved, additional incoming flow surfaces 49, 50 extend starting from the incoming flow edge 51 up to outer end edges of the first incoming flow surface 29. Thus, the first incoming flow surface 29 is covered entirely by the incoming flow structure 48 in the area of same. As an alternative, the incoming flow structure 48 may also have a smaller or larger width than the first incoming flow surface 29.

The plane of the first incoming flow surface 29 is aligned at right angles to the main incoming flow direction of the fluid according to arrow 25. Furthermore, the beam 26 of the laser 17 is likewise aligned at right angles to the plane of the first incoming flow surface 29 of the cantilever 47. By contrast, tangents of the curved, additional incoming flow surfaces 49, 50 of the incoming flow structure 48 are aligned, in at least some areas, obliquely to the plane of the first incoming flow surface 29 and thus obliquely to the main incoming flow direction of the fluid according to arrow 25 as well as obliquely to the beam 26 of the laser 17. The curved, additional incoming flow surfaces 49, 50 extend parallel to the longitudinal axis of the cantilever 47. In this exemplary embodiment, the main incoming flow direction according to arrow 25 lies in a plane, which is aligned at right angles to the planes of the first incoming flow surface 29 and to the curved surfaces of the additional incoming flow surfaces 49, 50.

Figure 7:
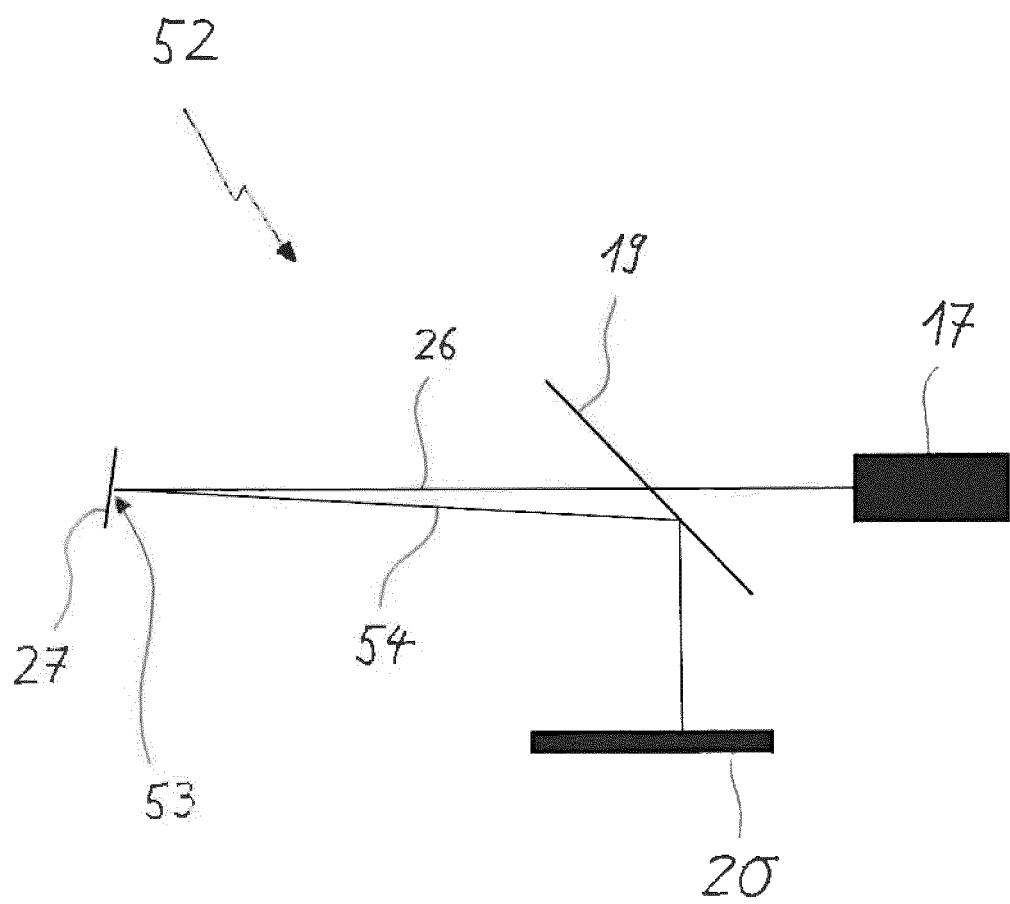
FIG. 7 is a schematic top view of a beam path of a device according to the present invention.

FIG. 7 shows a schematic top view of a beam path 52 of a device 10 according to the present invention. The beam of the laser 17 extends in the longitudinal direction of the device 10 according to FIG. 1. In this case, at least a part of the beam 26 passes through the beam splitter 19. In this exemplary embodiment, the beam splitter 19 is configured as a beam splitter membrane, namely as a so-called pellicle beam splitter. By contrast to a beam splitter cube, which is also conceivable, a smaller installation space is needed due to the use of a beam splitter membrane.

The beam 26 impacts the reflecting surface 27 of a cantilever 23, 28, 33, 42, 47, not shown in more detail here. A point of reflection 53, which is reflected according to the reflection beam 53 in the direction of the beam splitter 19, forms on the reflecting surface 27. In case of an unloaded cantilever 23, 28, 33, 42, 47, the plane of the reflecting surface 27 is aligned at a right angle to the beam 26. In case of a force acting on the cantilever 23, 28, 33, 42, 47 because of a fluid flow, the cantilever 23, 28, 33, 42, 47 is deflected and the reflecting surface 27 is aligned obliquely to the longitudinal axis of the beam 26, as shown, for example, in FIG. 7.

The reflection beam 54 is directed starting from the reflecting surface 27 in the direction of the beam splitter 19. A plane of the beam splitter 19 is aligned obliquely to the longitudinal axis of the beam 26. In this exemplary embodiment, the plane of the beam splitter is aligned at an angle of 45° to the beam 26.

The reflection beam 54 impacting the beam splitter 19 is diffracted in at least some areas in the direction towards the detector 20 by means of the beam splitter 19. Here, the reflection beam 54 is deflected by means of the beam splitter 19 by 90° to the longitudinal axis of the reflection beam 54 between the reflecting surface 27 and the beam splitter 19. The deflected reflection beam 54 then impacts the detector 20.

In this exemplary embodiment, a plane of the two-dimensional detector 20 is aligned at right angles to the longitudinal axis of the reflection beam between the beam splitter 19 and the detector 20 or parallel to the longitudinal axis of the beam 26.

Because of the configuration of the beam splitter 19 as a beam splitter membrane, here as a pellicle beam splitter, the so-called ghosting can be reduced considerably or can be entirely avoided. For example, when using a beam splitter cube, undesired multiple reflections occur in case of ghosting, which makes it difficult to make a clear determination of the point of impact of the reflection beam 54 on the detector 20.

The mode of operation of the device according to the present invention is explained in more detail below on the basis of FIGS. 1 through 7: The device 10 can be used for determining a parameter of a flow of a fluid, for example, a velocity and/or a flow direction of a gas or of a liquid. For example, the device 10 or the cantilever 23, 28, 33, 42, 47 is used as an anemometer. For this, the cantilever 23, 28, 33, 42, 47 is exposed to the flow of the fluid. The flow of the fluid impacts the incoming flow surfaces 29, 31, 32, 37, 38, 39, 40, 44, 45, 46, 49, 50, as a result of which a force due to the moving fluid acts on the cantilever 23, 28, 33, 42, 47, which leads to a deformation of the cantilever 23, 28, 33, 42, 47. The deformation is especially a bending and/or torsion of the cantilever 23, 28, 33, 42, 47. The desired information about velocity and incoming flow angle is contained in such a deformation of the cantilever 23, 28, 33, 42, 47. This information can be determined by means of known methods.

According to the present exemplary embodiment, a beam 26 of a laser 17 is focused in the area of a free end of the cantilever 23, 28, 33, 42, 47, which has the reflecting surface 27. The point of reflection 53 of the laser 17 reflected on the reflecting surface 27 moves as a function of the deformation of the cantilever 23, 28, 33, 42, 47. This point of reflection 53, which is moved and is reflected according to the reflection beam 54, can be detected by means of the detector 20. In this case, the detector 20 provides a two-dimensional measuring surface in order to be able to detect various positions of the reflected point of reflection 53. The position of the point of reflection 53 or of the reflection beam 54 determined on the detector 20 with regard to its position contains the necessary information that will be subsequently evaluated to determine the velocity and/or the flow direction of the fluid.

In this case, at least one section of the incoming flow surface 29, 31, 32, 37, 38, 39, 40, 44, 45, 46, 49, 50 is aligned obliquely or curved to a main incoming flow direction of the fluid according to arrow 25. As a result, a higher angular resolution can be obtained in case of determining the flow direction of the fluid. In this case, the main incoming flow direction of the fluid is predetermined as a mean and/or average flow direction of the fluid, preferably at an incoming flow angle of 0° in relation to the beam 26 and in an unloaded state of the cantilever 23, 28, 33, 42, 47. In particular, the flow directions and/or incoming flow angle of the fluid to be determined in relation to the incoming flow surface 29, 31, 32, 37, 38, 39, 40, 44, 45, 46, 49, 50 are arranged distributed about the main incoming flow direction of the fluid.

Thus, highly resolved measurements of the velocity and/or of a flow direction of a fluid in two dimensions, for example, on size scales below one mm, especially in the range of about 140 µm to 160 µm, and in an angle range of up to 180°, are possible with the device according to the present invention.

While specific embodiments of the invention have been shown and described in detail to illustrate the application of the principles of the invention, it will be understood that the invention may be embodied otherwise without departing from such principles.

The invention claimed is:

1. A device for determining at least one parameter of a flow of a fluid, the device comprising:
    an elastically deformable cantilever, which has at least one incoming flow surface for the fluid; and
    a measuring device for measuring a deformation of the cantilever, wherein at least one section of the incoming flow surface is aligned obliquely and/or curved to a main incoming flow direction of the fluid, the cantilever has an incoming flow structure at one free end, and the incoming flow structure has the at least one incoming flow surface for the fluid, the cantilever has a reflecting surface on a side facing away from the incoming flow structure, the measuring device has a laser, and a beam axis of the laser is directed at the reflecting surface of the cantilever, the incoming flow structure having an essentially V-shaped configuration, wherein the cantilever has a first incoming flow surface and the incoming flow structure has at least one additional incoming flow surface, the incoming flow structure being V-shaped, wherein the V-shaped incoming flow structure extends starting away from the first incoming flow surface.

2. A device in accordance with claim 1, wherein a plane and/or a tangent of a curvature of the incoming flow surface, comprising a plane of the reflecting surface for the laser, is aligned obliquely to the beam axis of the laser, the reflecting surface being made of aluminum.

3. A device in accordance with claim 1, wherein at the at least one section, a plane and/or a tangent of a curvature of the at least one incoming flow surface is aligned obliquely to a longitudinal axis of the device and/or obliquely to a beam axis of the laser of the measuring device at an angle in the range of 35° to 55°.

4. A device in accordance with claim 1, wherein the cantilever is associated with a carrier structure and/or has a plate-shaped configuration, the cantilever has a length of up to 2 mm, the cantilever has a width of up to 0.5 mm, and the cantilever has a thickness of up to 30 μm.

5. A device in accordance with claim 4, wherein the cantilever has a length in a range of 100 μm to 250 μm, the cantilever has a width in a range of 20 μm to 60 μm, and the cantilever has a thickness in a range of 1 μm to 3 μm.

6. A device in accordance with claim 1, wherein the cantilever and/or the incoming flow structure has a fluid-dynamic profile configured for producing a dynamic lift when the fluid is flowing about the cantilever and/or the incoming flow structure.

7. A device in accordance with claim 1, wherein the cantilever has a first incoming flow surface and the incoming flow structure has at least one additional incoming flow surface, the additional incoming flow surface extending starting from the first incoming flow surface, and a plane of the first incoming flow surface of the cantilever is aligned obliquely or at right angles to the plane and/or to a tangent of a curvature of the at least one additional incoming flow surface of the incoming flow structure.

8. A device in accordance with claim 1, wherein the incoming flow structure is produced from a photoresist, the incoming flow structure has a height of up to 0.5 mm, the incoming flow structure has a length of up to 0.5 mm, and the incoming flow structure has a thickness of up to 50 μm.

9. A device in accordance with claim 8, wherein the incoming flow structure is produced from SU-8, the incoming flow structure has a height in a range of 20 μm to 60 μm, the incoming flow structure has a length in a range of 20 μm to 60 μm, and the incoming flow structure has a thickness in a range of 6 μm to 12 μm.

10. A device in accordance with claim 1, wherein the cantilever has a first incoming flow surface, the V-shaped incoming flow structure opens in a funnel shape in a direction away from the first incoming flow surface or the V-shaped incoming flow structure forms a ramp shape tip directed away from the first incoming flow surface.

11. A device in accordance with claim 1, wherein the measuring device has a beam splitter plate and/or a beam splitter membrane for a beam of the laser, the measuring device has a two-dimensional, position-sensitive detector for detecting a position of a beam of the laser reflected by the cantilever.

12. A device in accordance with claim 11, wherein the beam splitter plate and/or a beam splitter membrane comprises a pellicle beam splitter.

13. A device in accordance with claim 1, wherein the plane and/or the tangent of the curvature of the incoming flow surface is aligned obliquely to a longitudinal axis of the device.

14. A device in accordance with claim 1, wherein at the at least one section, a plane and/or a tangent of a curvature of the at least one incoming flow surface is aligned obliquely to a longitudinal axis of the device and/or obliquely to a beam axis of the laser of the measuring device at an angle in the range of 40° to 50°.

15. A method for determining at least one parameter of a flow of a fluid, the method comprising the steps of
providing a device, comprising an elastically deformable cantilever with at least one incoming flow surface for the fluid and a measuring device for measuring a deformation of the cantilever;
inserting the cantilever into a flow; and
measuring the deformation of the cantilever with the measuring device based on the forces of the flow acting on the incoming flow surface, wherein at least one section of the incoming flow surface is aligned obliquely and/or curved to a main incoming flow direction of the fluid, the cantilever has an incoming flow structure at one free end, and the incoming flow structure has the at least one incoming flow surface for the fluid, wherein the cantilever has a reflecting surface on a side facing away from the incoming flow structure, and the measuring device has a laser, wherein a beam axis of the laser is directed at the reflecting surface of the cantilever, the incoming flow structure having an essentially V-shaped configuration, wherein the cantilever has a first incoming flow surface and the incoming flow structure has at least one additional incoming flow surface, the incoming flow structure being V-shaped, wherein the V-shaped incoming flow structure extends starting away from the first incoming flow surface.

16. A method in accordance with claim 15, wherein the at least one parameter of the flow of the fluid is measured by deploying the device as a cantilever anemometer, in air and/or space travel, a wind energy application, a medicine application and/or in connection with a mixing process and/or a combustion processes, the deformation of the cantilever being produced because of a bending and/or torsion of the cantilever based on the forces of the flow of the fluid acting on the at least one incoming flow surface, wherein a velocity of the flow is evaluated as a function of the bending and/or a flow direction, based on an incoming flow angle being evaluated as a function of the torsion, and an angle range from +90° to −90° in relation to the main incoming flow direction is covered.

17. A device for determining at least one parameter of a flow of a fluid, the device comprising:
an elastically deformable cantilever comprising at least one incoming flow surface for the fluid; and
a measuring device for measuring a deformation of the cantilever, wherein at least one section of the incoming flow surface is aligned obliquely and/or curved to a main incoming flow direction of the fluid, the cantilever comprising a cantilever free end portion and an incoming flow structure in contact with the cantilever free end portion, the incoming flow structure having a first incoming flow structure portion and a second incoming flow structure portion, the first incoming flow structure portion and the second incoming flow structure portion defining a V-shape configuration of the incoming flow structure, the incoming flow structure comprising at least one additional incoming flow surface for the fluid, the cantilever having a reflecting surface on a side facing away from the incoming flow structure, the measuring device having a laser, wherein a beam axis of the laser is directed at the reflecting surface of the cantilever, wherein the V-shaped incoming flow structure extends starting away from the at least one incoming flow surface.

18. A device for determining at least one parameter of a flow of a fluid, the device comprising:
an elastically deformable cantilever comprising at least one incoming flow surface for the fluid; and
a measuring device for measuring a deformation of the cantilever, wherein at least one section of the incoming flow surface is aligned obliquely and/or curved to a main incoming flow direction of the fluid, the cantilever comprising a cantilever free end portion and an incoming flow structure in contact with the cantilever free end portion, the incoming flow structure having a first incoming flow structure portion and a second incoming flow structure portion, the first incoming flow structure portion comprising a first incoming flow structure portion first end portion and a first incoming flow structure portion second end portion, the first incoming flow structure portion first end portion being adjacent to the cantilever free end portion, the first incoming flow structure portion second end portion being located at a spaced location from the cantilever free end portion, the second incoming flow structure portion comprising a second incoming flow structure portion first end portion and a second incoming flow structure portion second end portion, the second incoming flow structure portion first end portion being adjacent to the cantilever free end portion, the second incoming flow structure portion second end portion being located at a spaced location from the cantilever free end portion, the second incoming flow structure portion second end portion being located at a spaced location from the first incoming flow structure portion second end portion, the first incoming flow structure portion first end portion being in contact with the second incoming flow structure portion first end portion, wherein a distance between the first incoming flow structure portion and the second incoming flow structure portion increases from the first incoming flow structure portion first end portion and the second incoming flow structure portion first end portion to the first incoming flow structure portion second end portion and the second incoming flow structure portion second end portion, the incoming flow structure comprising the at least one incoming flow surface for the fluid, the cantilever having a reflecting surface on a side facing away from the incoming flow structure, the measuring device having a laser, wherein a beam axis of the laser is directed at the reflecting surface of the cantilever, wherein the incoming flow structure extends starting away from the at least one incoming flow surface.

* * * * *